(12) United States Patent
Raveendran (10) Patent No.: US 7,430,336 B2
(45) Date of Patent: Sep. 30, 2008

(54) METHOD AND APPARATUS FOR IMAGE ENHANCEMENT FOR LOW BIT RATE VIDEO COMPRESSION

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 11/120,403

(22) Filed: May 2, 2005

(65) Prior Publication Data

US 2005/0276505 A1 Dec. 15, 2005

Related U.S. Application Data

(60) Provisional application No. 60/569,369, filed on May 6, 2004.

(51) Int. Cl.
*G06K 9/40* (2006.01)
(52) U.S. Cl. .................. 382/268; 382/263; 382/264
(58) Field of Classification Search ........... 382/263, 382/264, 266, 268, 275
See application file for complete search history.

(56) References Cited

U.S. PATENT DOCUMENTS

| 5,229,864 | A | | 7/1993 | Moronaga et al. | |
| 5,799,111 | A | * | 8/1998 | Guissin | 382/254 |
| 5,822,467 | A | * | 10/1998 | Lopez et al. | 382/261 |
| 5,854,859 | A | * | 12/1998 | Sobol | 382/261 |
| 6,041,145 | A | * | 3/2000 | Hayashi et al. | 382/268 |
| 6,614,944 | B1 | * | 9/2003 | Levantovsky | 382/261 |
| 7,126,989 | B2 | * | 10/2006 | Hagai et al. | 375/240.13 |
| 2002/0076043 | A1 | | 6/2002 | Van Der Vleuten | |
| 2002/0118399 | A1 | * | 8/2002 | Estevez et al. | 358/426.07 |
| 2003/0053541 | A1 | * | 3/2003 | Sun et al. | 375/240.16 |
| 2003/0053708 | A1 | * | 3/2003 | Kryukov et al. | 382/261 |
| 2003/0053711 | A1 | * | 3/2003 | Kim | 382/268 |
| 2003/0076858 | A1 | * | 4/2003 | Deshpande | 370/468 |
| 2003/0081854 | A1 | | 5/2003 | Deshpande | |
| 2003/0138154 | A1 | | 7/2003 | Suino | |
| 2003/0206587 | A1 | * | 11/2003 | Gomila | 375/240.12 |
| 2003/0206664 | A1 | * | 11/2003 | Gomila et al. | 382/268 |
| 2004/0017852 | A1 | * | 1/2004 | Garrido et al. | 375/240.16 |
| 2004/0101059 | A1 | * | 5/2004 | Joch et al. | 375/240.29 |
| 2004/0184549 | A1 | * | 9/2004 | Webb | 375/240.29 |
| 2004/0190626 | A1 | * | 9/2004 | Sun et al. | 375/240.18 |
| 2005/0276323 | A1 | * | 12/2005 | Martemyanov et al. | 375/240.03 |

OTHER PUBLICATIONS

List, P.; Joch, A.; Lainema, J.; Bjontegaard, G.; Karcaewicz, M., "Adaptive Deblocking Filter," Jul. 2003, IEEE Transactions on Circuits and Systems for Video Technology, vol. 13, No. 7, pp. 614-619.*

ITU-T Sudy Group 16, "Advanced video coding for generic audio-visual services, ITU-T Recommendation H.264", Series H: Audiovisual and Multimedia Systems, May 2003, pp. 1-2 and 134-154, Geneva, Switzerland.

* cited by examiner

*Primary Examiner*—Matthew C. Bella
*Assistant Examiner*—Anthony Mackowey
(74) *Attorney, Agent, or Firm*—Thomas R. Rouse (57) ABSTRACT

A method and apparatus for deblocking and edge enhancement of block based digital video includes determining that two blocks share a common boundary; measuring edge activity of the common boundary, comparing the measured edge activity to a first threshold, filtering one or more pixels of the two blocks with a low pass filter if the edge activity is below the first threshold, and enhancing one or more pixels of the two neighboring blocks if the edge activity is at or above the first threshold.

29 Claims, 5 Drawing Sheets

METHOD AND APPARATUS FOR IMAGE ENHANCEMENT FOR LOW BIT RATE VIDEO COMPRESSION

CLAIM OF PRIORITY UNDER 35 U.S.C. §119

The present Application for Patent claims priority to Provisional Application No. 60/569,369 entitled "Method and Apparatus for Image Enhancement For Low Bit Rate Video Compression" filed May 6, 2004, and assigned to the assignee hereof and hereby expressly incorporated by reference herein.

BACKGROUND

1. Field

The invention relates to data compression in general and to block-based compression in particular.

2. Background

Transform coding is a common image compression technique that divides an image into sub-images or blocks for processing. Block-based compression introduces artifacts between block boundaries because blocks are independently coded. Therefore, the transform does not take into consideration the correlation between block boundaries. Accordingly, the technique typically results in low bit rate images that are heavily compressed, but contain severe compression artifacts such as blocking, ringing and motion smear.

Scalable video coding is acquiring widespread acceptance into low bit rate applications, particularly in heterogeneous networks with varying bandwidths (e.g. Internet and wireless streaming). Scalable video coding enables coded video to be transmitted as multiple layers—typically, a base layer contains the most valuable information and occupies the least bandwidth (lowest bit rate for the video) and enhancement layers offer refinements over the base layer. Most scalable video compression technologies exploit the fact that the human visual system is more forgiving of noise (due to compression) in high frequency regions of the image than the flatter, low frequency regions. Hence, the base layer predominantly contains low frequency information and high frequency information is carried in enhancement layers. When network bandwidth falls short, there is a higher probability of receiving just the base layer of the coded video (no enhancement layers). In such situations, the reconstructed video is blurred and deblocking filters may even accentuate this effect.

As a result, several post-processing algorithms for deblocking have been proposed to reduce and/or eliminate compression artifacts. However, many involve complex computations and may result in an overall blurring effect on the output image. Other de-blocking filters do not conserve edge information effectively and are typically complex to implement in hardware.

SUMMARY

Methods and apparatus for enhancing image quality through blur reduction by emphasizing the high frequency edges in a decoded base layer, are described. A high pass filter can mark, i.e. highlight, the edges of neighboring 4×4 pixel blocks and then overlay the highlights onto the image. In the case of hardware implementations like Mobile Station Modem (MSM) device platforms used in wireless technologies, the disclosed methods and apparatus can use deblocking filter conditionals and circuitry already existent in video cores to introduce a high frequency enhancement feature with little or no additional cost.

DETAILED DESCRIPTION

In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments.

It is also noted that the embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Methods and apparatus to enhance the quality of images compressed using block based compression by emphasizing the high frequency edges in a decoded image, are described. A high frequency emphasis filter can amplify, i.e. enhance, the edges of each image block received with the result that the edges of the image blocks are enhanced. As a result of allowing the low frequencies to pass, areas of constant intensity in the input image are basically unaffected by the high frequency emphasis filter. Areas of a strong intensity gradient, containing the high frequencies, are accentuated or amplified in the filter output. A high pass filter could also be utilized with the output of the high pass filter being added, or overlaid onto the image, thereby enhancing the edges of the image. Since the output of the high pass filter is nearly zero for low frequency areas, areas of constant intensity are not affected noticeably by the overlaid output. The edge enhancement feature is useful in a temporally scalable video delivery system when the base layer is received, but some of the enhancement layer data is not received, or received with errors.

Figure 1:
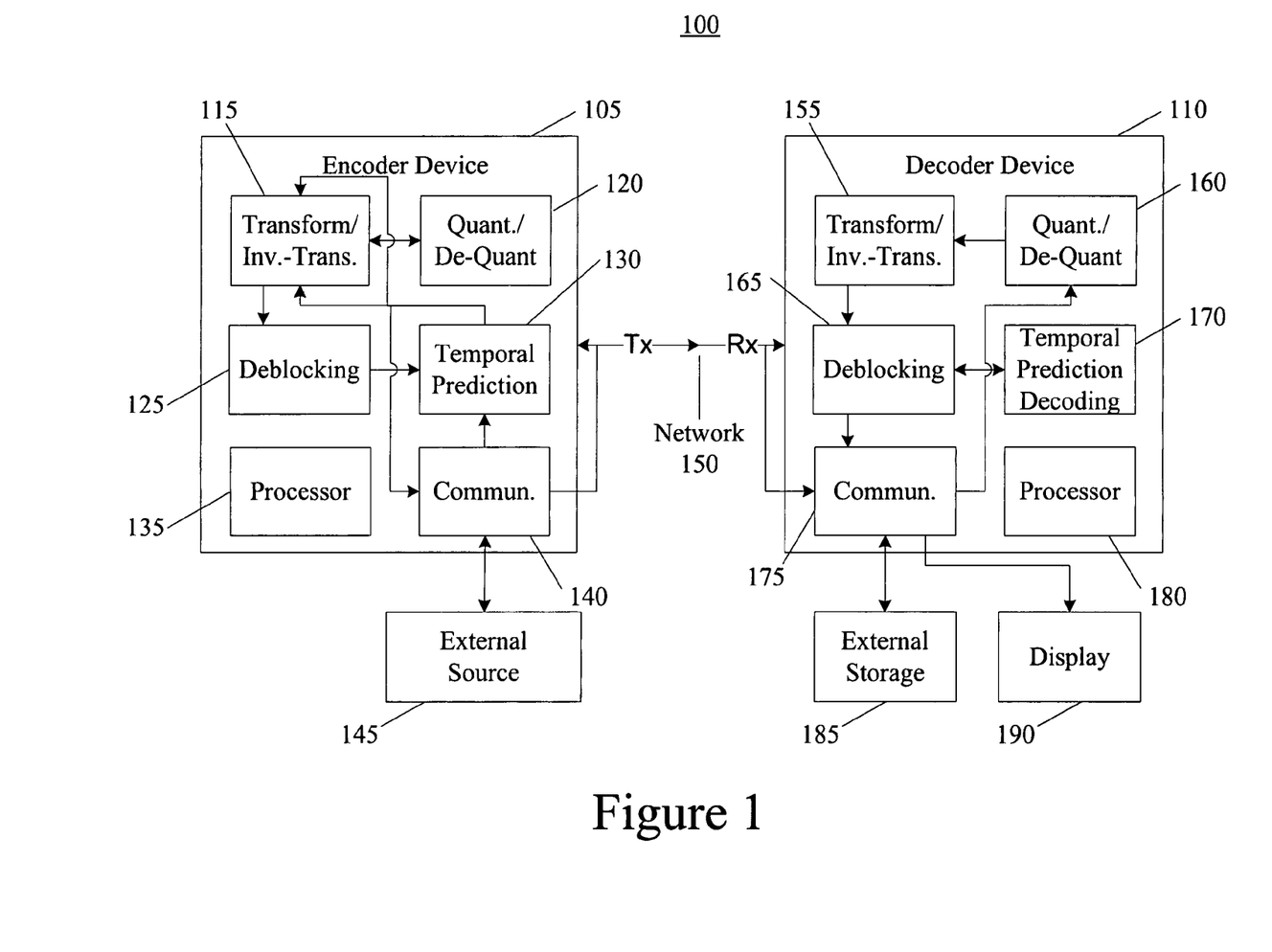
FIG. 1 is an illustration of an example of a communication system for delivery of streaming video.

FIG. 1 is a block diagram of a general communications system for encoding and decoding streaming pictures. The system 100 includes encoder device 105 and decoder device 110. Encoder device 105 further includes transform component 115, quantization component 120, deblocking 125, temporal prediction component 130, processor component 135, and communications component 140. Processor 135 provides the computing platform to perform the processes of the other components. Transform component 115 transforms video data from the spatial domain to another domain, such as the frequency domain in the case of DCT (discrete cosine transform). The data that is being transformed can be intra-coded data where the actual video data is transformed, or it can be inter-coded data where a motion vector and residual error are transformed. Other digital transforms include the Hadamard transform, DWT (discrete wavelet transform), and integer transforms such as used in H.264.

Quantization component 120 allocates the number of bits to represent each of the transformed coefficients. The quantization of the transformed coefficients can be changed for every macroblock, where a macroblock is a block of 16×16 pixels (a macroblock is made up of a 16×16 Luma block, and two 8×8 Chroma blocks). The quantization parameter, QP, determines the level of quantization that is performed. More digital compression is realized by increasing QP providing for coarser digital representation of the coefficients, but artifacts such as blurring and blocking can also be introduced. Deblocking component 125 performs low pass filtering and/or edge enhancement. Temporal prediction component 130 locates a best matching macroblock in reference frame (or frames) and calculates a motion vector that identifies the best matching macroblock.

Transform component 115 and quantization component 120 also perform inverse transformation and de-quantization, respectively. These inverse operations are performed in the encoder to allow for reconstruction of the compressed video data such that temporal prediction component 130 can perform its predictions with the same reconstructed video data as a decoder device that is receiving the encoded data. For the same reason, deblocking component 125 can perform low pass filtering and/or edge enhancement in encoder device 105. The deblocking operation is performed after the dequantization and inverse transforming in the reconstruction process.

Communications component 140 contains logic used to receive data to be encoded from external source 145. External source 145 could be, for example, external memory, the Internet, a live video and/or audio feed, and receiving the data can include wired and/or wireless communications. Communications component 140 also contains logic to transmit (Tx) encoded data over Network 150. Network 150 can be part of a wired system such as telephone, cable, and fiber optic, or a wireless system. In the case of wireless, communication systems, network 140 can comprise, for example, part of a code division multiple access (CDMA or CDMA2000) communication system or alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques.

Decoder device 110 contains similar components as encoder device 105 including inverse transform component 155, de-quantization component 160, deblocking component 165, temporal prediction decoding component 170, communications component 175 and processor component 180. Decoder device 110 receives encoded data that has been transmitted over network 150 or from external storage 185. Communications component 175 contains logic used for receiving (Rx) encoded data in conjunction with network 150, as well as logic for receiving encoded data from external storage 185. External storage 185 could be, for example, external RAM or ROM, or a remote server. Intra-coded data is processed by dequantization component 160, followed by inverse transform component 155, followed by deblocking component 165 resulting in a decoded picture that can be displayed on display component 190. Deblocking component 165 performs low pass filtering and/or edge enhancement.

Inter-coded data can only be decoded after the reference frame(s), from which it was predicted, is decoded. The residual error coefficients are processed by dequantization component 160, followed by inverse transform component 155 followed by deblocking component 165 resulting in a decoded residual error. The residual error is then combined with a best matching macroblock from the reference frame that was located by temporal prediction decoding component 170. Deblocking component 165 then processes the inter-coded frame, resulting in a decoded inter-coded frame. The decoded frames can be displayed with display component 190, stored in external storage 185 or stored in internal memory of processor component 180. Display component 190 can be an integrated part of the decoding device that contains such parts as video display hardware and logic, including a display screen, or it can be an external peripheral device. Communications component 175 also contains logic used to communicate the decoded frames to external storage component 185 or display component 190. The low pass filtering and edge enhancement performed by deblocking components 125 and 165 are discussed in more detail below.

A video encoding standard known as H.264 was jointly developed by the Moving Picture Experts Group (MPEG) and the International Telecommunication Union (ITU) and has been added to the MPEG-4 specification as MPEG-4 Part 10 or Advanced Video Coding (AVC).

A de-blocking filter specified in H.264 requires decision trees that determine the activity along block boundaries. As originally designed in H.264, block edges with image activity beyond set thresholds are not filtered or weakly filtered, while those along low activity blocks are strongly filtered. The filters applied can be such, as, for example, 3-tap or 5-tap low pass Finite Impulse Response (FIR) filters.

In one example, an edge enhancement method is achieved through high-frequency emphasis using the deblocking filter. Deblocking filter designs for block based video compression predominantly follow a common principle, the measuring of intensity changes along block edges, followed by a determination of strength of the filter to be applied and then by the actual low pass filtering operation across the block edges. The goal of deblocking filters is to reduce blocking artifacts through smoothing (low pass filtering across) of block edges. In order to avoid blurring of edge features in the image, edge activity measurement is performed and low pass filtering is normally applied in non-edge regions (the lower the edge activity measurement in the region, the stronger the filter). Through modifications to the deblocking filter, such as, for example, by changing the coefficients of the filters, the deblocking filter can function in a complimentary fashion and enhance the detected edges using high frequency emphasis filters (in an ideal sense, a high frequency emphasis filter is simply 1+high pass filter).

Edge enhancement using a deblocking filter also has applications in temporally scalable coded bitstreams that include a base layer and an enhancement layer. In a condition where the decoder receives the base layer but does not receive all of the enhancement layer(s), the reconstructed image sequence will be blurred and enhancing the edge or activity (using high pass filtering or high frequency emphasis) in the received image could improve the perceptive image quality. Implementing edge enhancement in the de-blocker can be more efficient since the filter decisions are already part of the existing design. Moreover, implementing such a pixel domain post-processing function in a digital signal processor (DSP) platform would consume many valuable MIPS that could be utilized for scalability support in the bitstream, as well as many other quality enhancement functions.

An in-loop deblocking filter (included after the encoder's decoder enabling prediction on de-blocked reconstructed frames) can operate on all 4×4 block boundaries and impact every pixel of the reconstructed frame. Although complex (in terms of computations), this deblocking feature is required for compliance to H.264 standards and the widespread adoption and proliferation of the standard necessitates its implementation on software, firmware and hardware platforms depending on the target application. As a result, access to every pixel of the reconstructed video is provided. This enables the ability to apply post-processing functions to reconstructed video such as image enhancement, edge enhancement, error concealment (in video transmission applications over error-prone networks), frame rate up conversion, and more. While, the baseline H.264 standard does not offer scalability modes, extensions to H.264 enable Scalable Video Coding (SVC) where high frequency emphasis filtering for edge enhancement can be applied.

Figure 2:
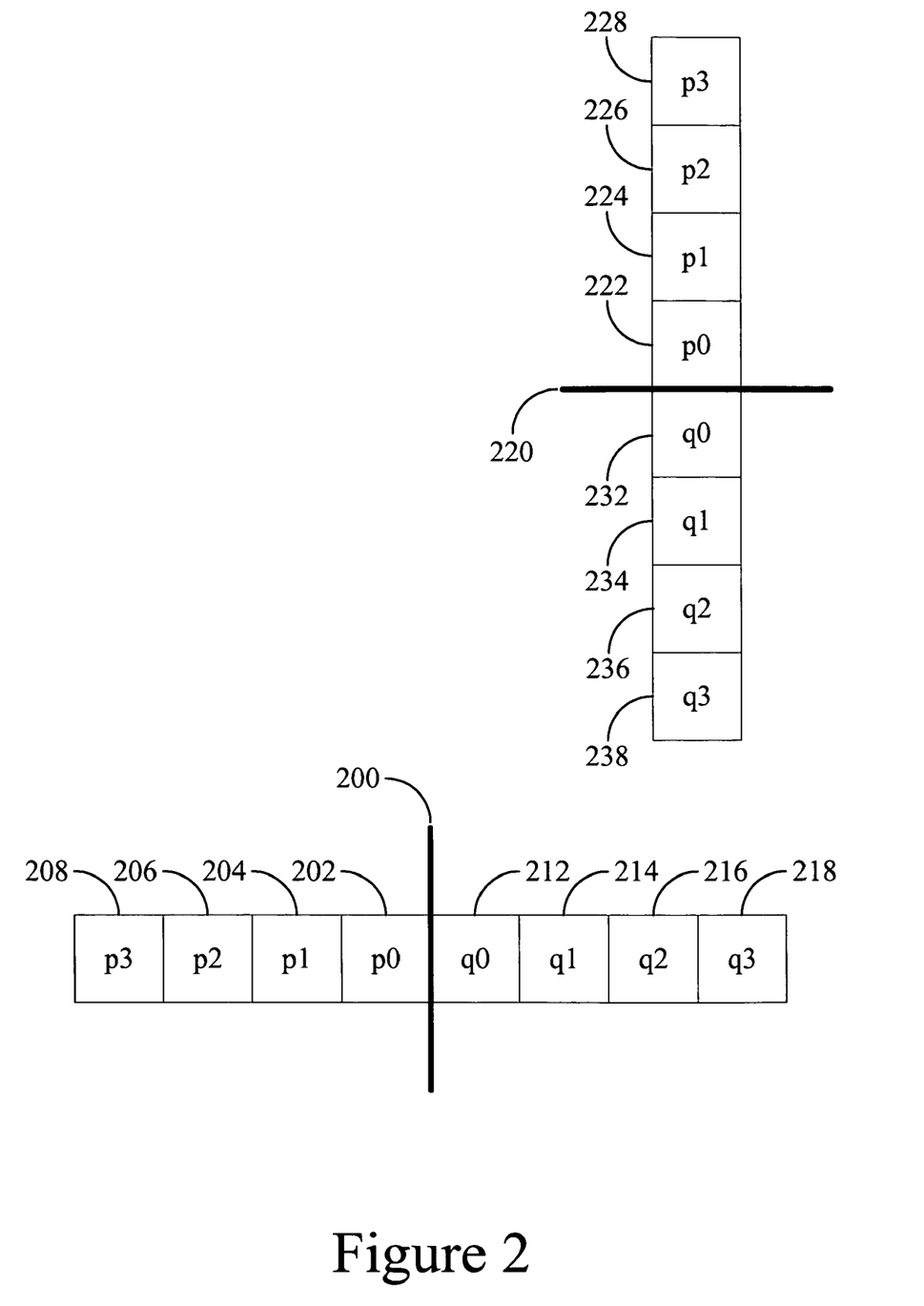
FIG. 2 is an illustration of pixels adjacent to vertical and horizontal 4×4 block boundaries.

FIG. 2 is an illustration of pixels adjacent to vertical and horizontal 4×4 block boundaries. Vertical boundary 200 represents any boundary between two side-by-side 4×4 blocks. Pixels 202, 204, 206 and 208, labeled p0, p1, p2 and p3 respectively, lie to the left of vertical boundary 200 while pixels 212, 214, 216 and 218, labeled q0, q1, q2 and q3 respectively, lie to the right of vertical boundary 200. Horizontal boundary 220 represents any boundary between two 4×4 blocks, one directly above the other. Pixels 222, 224, 226 and 228, labeled p0, p1, p2 and p3 respectively, lie above horizontal boundary 200 while pixels 232, 234, 236 and 238, labeled q0, q1, q2 and q3 respectively, lie below horizontal boundary 200. In the example below, the filtering operations affect up to three pixels on either side of, above or below the boundary. Depending on the quantizer used for transformed coefficients, the coding modes of the blocks (intra or inter coded), and the gradient of image samples across the boundary, several outcomes are possible, ranging from no pixels filtered to filtering pixels p0, p1, p2, q0, q1 and q2.

In one example, a determination is made that there is sufficient edge activity to perform high frequency emphasis filter edge enhancement, i.e., edge activity above a threshold. If the edge activity is below the threshold, then low pass filtering can be performed. Alternatively, high frequency emphasis filtering can be performed on all edges regardless of activity and then a decision to low pass filter can be made. Alternatively, a second threshold could be used where high frequency emphasis filtering is performed if edge activity is above the second threshold and low pass filtering is performed if edge activity is below the first threshold.

H.264 deblocking comprises strong filtering methods used in areas of relatively little activity, and hence very little likelihood of edges, and weak filtering which is used in areas with higher activity an therefore more likelihood of an edge. The following discussion involves only the H.264 weak deblocking filter methods. To determine a maximum threshold, below which low pass filtering is performed by the original H.264 weak deblocking filters, the following variables are first computed to determine the strength of filtering and under which activity conditions each 4×4 block edge under consideration is filtered:

Threshold $t_C$ is determined as follows.
for luma:

$$t_C = t_{C0} + ((a_p < \beta)?1:0) + ((a_q < \beta)?1:0) \quad [1]$$

for chroma:

$$t_C = t_{C0} + 1 \quad [2]$$

where $a_p = Abs\,(p_2 - p_0)$ and $a_q = Abs\,(q_2 - q_0)$ \quad [3]

In H.264, the variable $t_{C0}$ is the activity threshold based on bS (boundary strength) and indexA, (indexA is an offset from quantization parameter QP, where QP varies from 0 to 51). The activity measurements $a_p$ and $a_q$, given in equation [3] above, increment $t_{C0}$ by 1 each when they are less than $\beta$ (see equation [1] above). The larger $\beta$, the more likely that an edge is present and the less likely that low pass filtering will be performed. Boundary strength is determined for each 4×4 block edge and ranges from zero to 4. Details of boundary strength determination are known to those of ordinary skill in the art and are not necessary to understand the disclosed method. Once the boundary strengths are derived, indexA values are determined based on the average QP's of the neighboring blocks. Since QP changes on a macroblock basis and is different for luma and chroma, 3 values of luma and chroma average QP (and hence 6 indexA's) are computed: 1) along the leftmost macroblock edge, 2) along the topmost macro block edge and 3) for all 4×4 block edges internal to the macroblock. Once the indexA values are calculated, the values for $\beta$ are determined in a look-up table and the values for $\beta$ range from zero to 18. The threshold $t_c$ is then computed in equations [1] and [2] above and the low pass filtering parameter Delta is computed:

Delta:

$$\Delta = Clip3(-t_C, t_C, ((((q_0 - p_0) << 2) + (p_1 - q_1) + 4) >> 3)) \quad [4]$$

Low pass Filtering of $p_i, q_i$, $i=0,1,2$ for both luma and chroma occurs as follows:

$$p'_0 = Clip1(p_0 + \Delta) \quad [5]$$

$$q'_0 = Clip1(q_0 - \Delta) \text{ where} \quad [6]$$

$$Clip1(x) = Clip3(0, 255, x) \text{ where} \quad [7]$$

$$Clip3(x, y, z) = \begin{cases} x; z < x \\ y; z > y \\ z; \text{otherwise} \end{cases} \quad [8]$$

The low pass filtering of equations [5] and [6] above is only the first low pass filtering in the H.264 deblocking filter. In addition to this low pass filtering, a second type of low pass filtering is also performed. In this example, it is in this second type of low pass filtering where the disclosed method is implemented. The filtering for Luma in equations [9], [10], [11] and [12] below depends on edge activity measurements $a_p$ and $a_q$ and filters only pixels p1 and q1 (see pixels 204, 214, 224 and 234 of FIG. 2) and includes low pass filtering when the edge activity measurements are below a threshold $\beta$ and high frequency emphasis filtering when the edge activity measurements are above the threshold:

If $(a_p < \beta)$, low pass filter as follows:

$$p'_1 = p_1 + Clip3(-t_{C0}, t_{C0}, (p_2 + ((p_0 + q_0 + 1) >> 1) - (p_1 << 1)) >> 1) \quad [9]$$

else, high pass filter as follows:

$$p'_1 = p_1 + Clip3(-t_{C0}, t_{C0}, ((p_2 >> 1) - ((p_0 + q_0 + 1) >> 1) + (p_1 >> 1)) >> 1) \quad [10]$$

If $(a_q < \beta)$, low pass filter as follows:

$$q'_1 = q_1 + Clip3(-t_{C0}, t_{C0}, (q_2 + ((p_0 + q_0 + 1) >> 1) - (q_1 << 1)) >> 1) \quad [11]$$

else, high pass filter as follows:

$$q'_1 = q_1 + Clip3(-t_{C0}, t_{C0}, ((q_2 >> 1) - ((p_0 + q_0 + 1) >> 1) + (q_1 >> 1)) >> 1) \quad [12]$$

The filtering of the p1 and q1 pixels was found to offer satisfactory edge enhancement without producing artifacts such as aliasing. It was found that filtering pixels p0 and q0 resulted in aliasing and/or blocking artifacts.

To summarize, when the activity along the block edge is weak (below β), the edge is low pass filtered as follows:

$$p_1 = p_1 + Clip3\left(-tc_0, tc_0, \left[\frac{p_2}{2} + \frac{p_0 + q_0}{4} - p_1\right]\right) \quad [13]$$

When the activity is above β, the deblocking filtering is changed to high frequency emphasis as follows:

$$p_1 = p_1 + Clip3\left(-tc_0, tc_0, \left[\frac{p_2}{4} - \left(\frac{p_0 + q_0}{4}\right) + \frac{p_1}{4}\right]\right) \quad [14]$$

In an example embodiment, the high pass filtering operation can be enabled using a determined boundary strength (bS) value, such as, for example, 7 (where 7 is an arbitrary value that does not correspond to any of the H.264 standardized values of bS from zero to 4) such that the high pass filtering operation is activated by the decoder when only the base layer and no enhancement layer is received. Since 3-bits are required to represent the value of bS, any value from 5 thru 7 can be used to indicate that a given 4×4 block edge is required to be enhanced or edge enhancement should be turned on. As discussed above, a second threshold (β2 for example) could be used where high frequency emphasis filtering is performed if edge activity is above second threshold β2 and low pass filtering is performed if edge activity is below the first threshold β.

Figure 3:
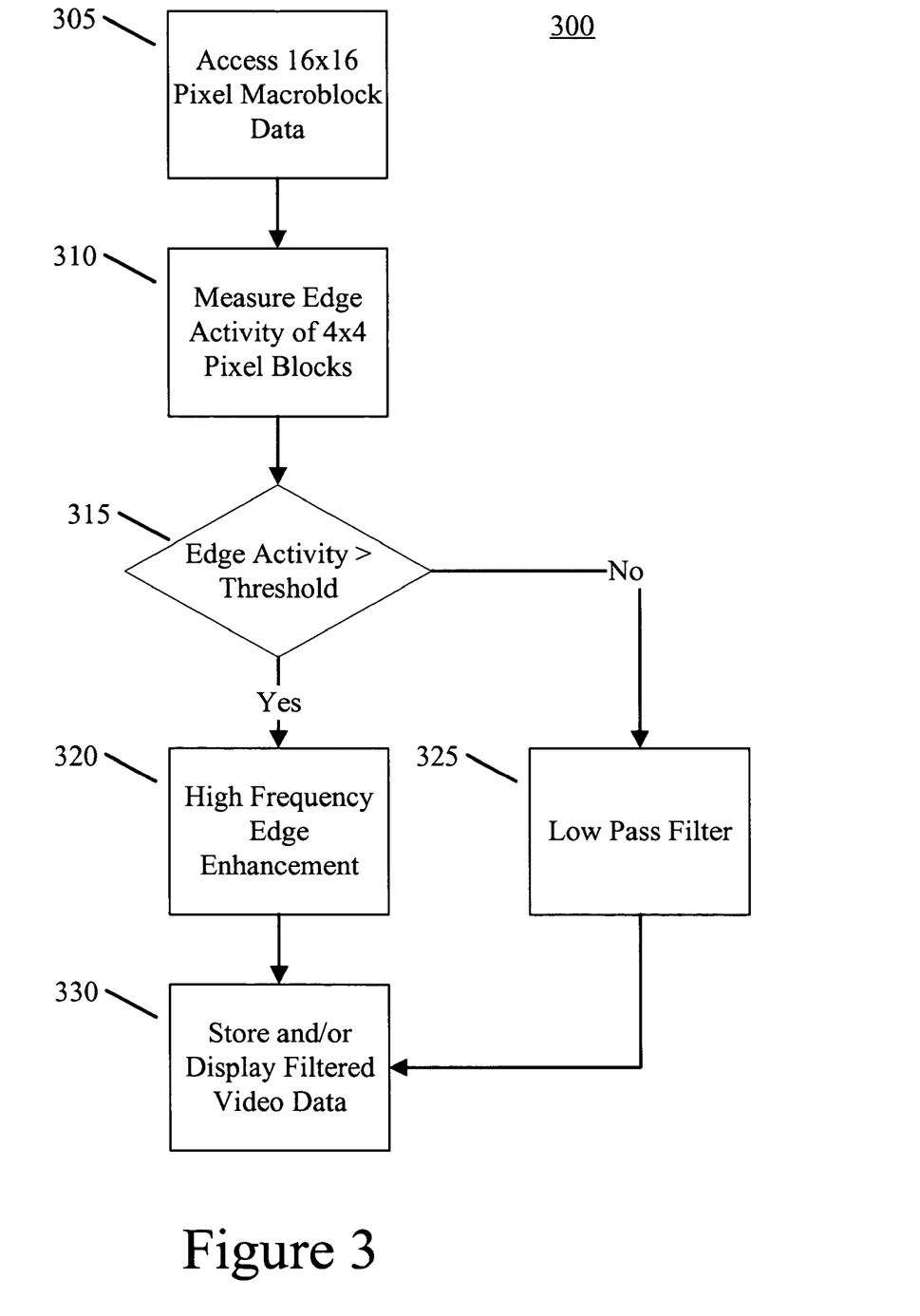
FIG. 3 is an illustration of one example of an image compressor.
Figure 4:
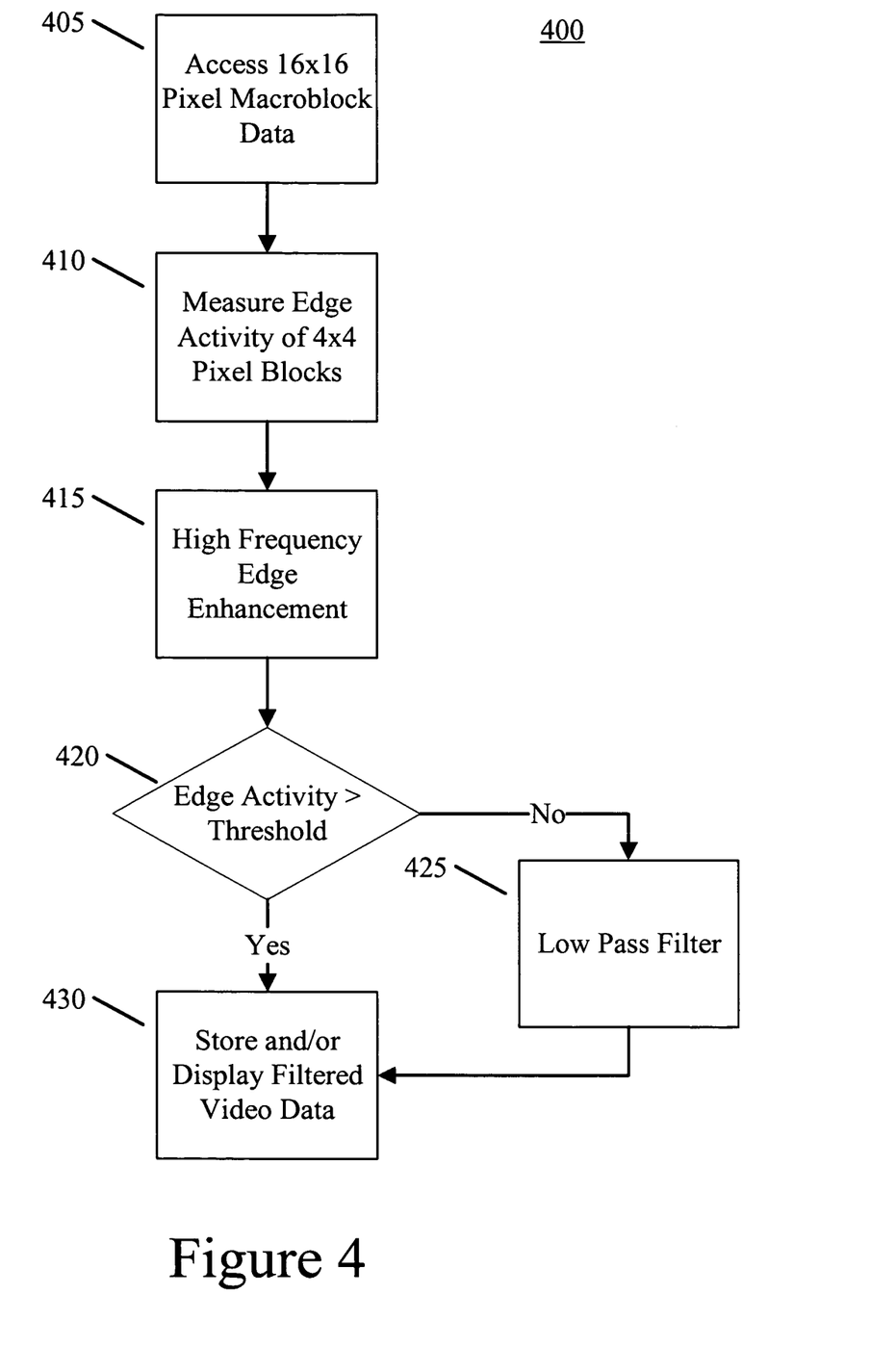
FIG. 4 is an illustration of one example of an image decompressor that is symmetric to the image compressor.
Figure 5:
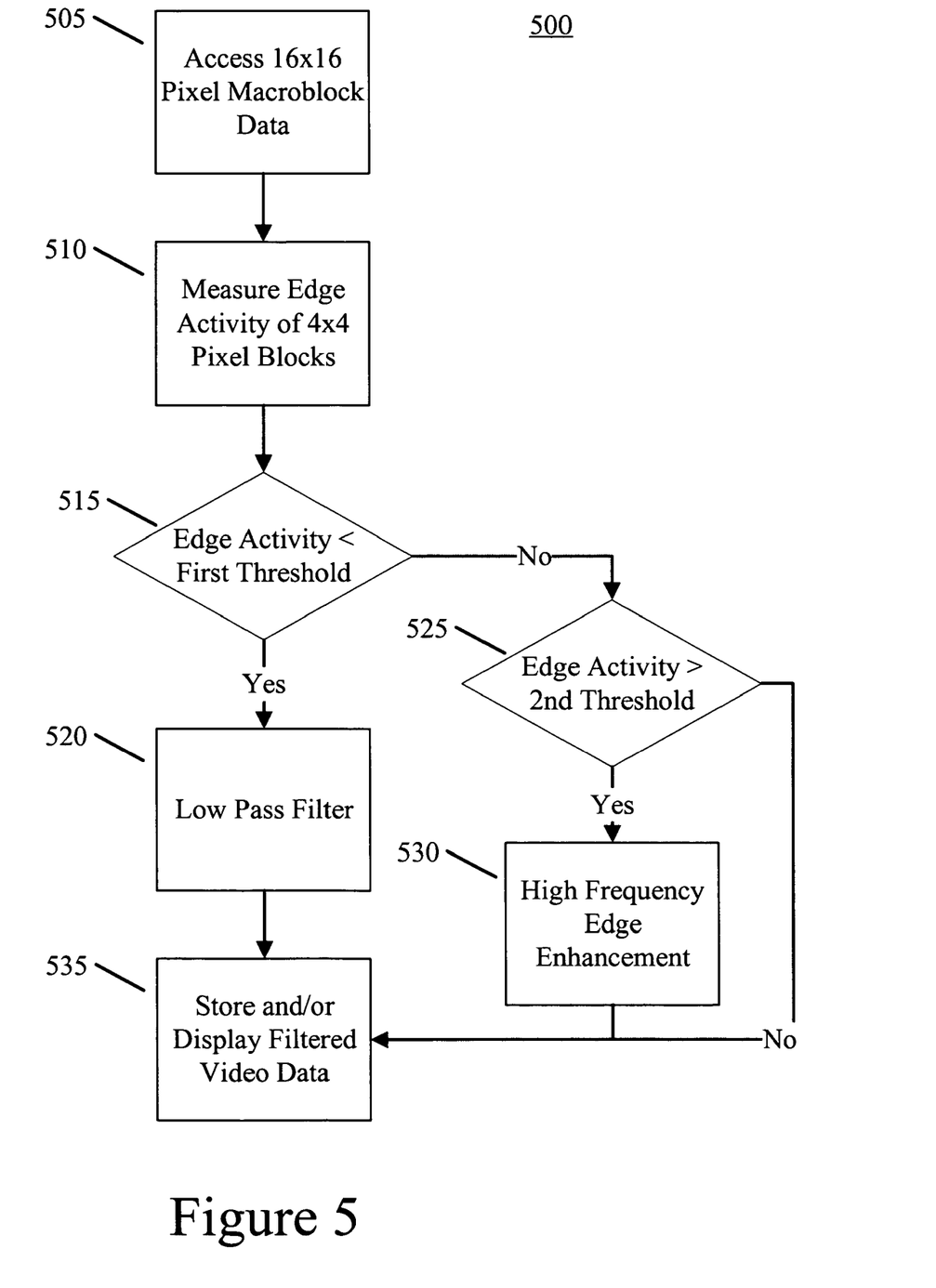
FIG. 5 is a flowchart of one example embodiment to process images.

FIGS. 3, 4 and 5 show flow charts illustrating examples of deblocking processes including edge enhancement. The processes illustrated in FIGS. 3, 4 and 5 can be performed by devices such as encoder device 105 and decoder device 110 of FIG. 1. Process 300 in FIG. 3 utilizes a single threshold similar to an example discussed above and contained in equations [9], [10], [11] and [12]. Deblocking process 300 can be performed in raster order as macroblocks are decoded or postponed until an entire frame is decoded. A processor such as processor components 135 and 180 in FIG. 1 accesses from memory, step 305, 16×16 pixel macroblocks that have been received, dequantized, and inverse transformed. Receiving means such as communications components 140 and 175 in FIG. 1, along with neighboring block determining means such as deblocking components 125 and 165 in FIG. 1 can perform step 305. The edge activity along each edge of each pair of neighboring 4×4 blocks is measured, step 310. Edge activity can be measured in a way such as, for example, that shown for $a_p$ and $a_q$ in equation [3] above. Measuring means such as deblocking components 125 and 165 in FIG. 1 can perform step 310. If it is determined that edge activity is above a threshold, step 315, then edge enhancement is performed, step 320. Edge enhancement can be performed with high frequency emphasis filtering such as in equations [10] and [12] above, or by employing a high pass filter and overlaying (adding) the output of the high pass filter onto the enhanced pixels. Enhancing means such as deblocking components 125 and 165 in FIG. 1 can perform step 320. Comparing means such as deblocking components 125 and 165 can perform step 315. If, in step 315, it is determined that the edge activity is not greater than the threshold, then the pixels are low pass filtered, step 325. Low pass filtering can be performed with low pass filtering such as equations [5], [6], [9] and [11] above. After filtering, a 4×4 block is stored into memory, step 330. Steps 305 through 330 are repeated until an entire frame is low pass filtered and/or high frequency emphasis filtered, at which time the frame can be stored to memory or displayed, step 330. Steps 305 through 330 are repeated until the encoded bitstream is completed.

FIGS. 4 and 5 show variations of process 300. Process 400 in FIG. 4 performs edge enhancement by high frequency emphasis filtering of each boundary between 4×4 neighboring blocks regardless of the edge activity measurement, step 415. If the edge activity, as measured in step 410, is at or less than the threshold, step 420, then the neighboring blocks are low pass filtered. Process 500 in FIG. 5 utilizes two thresholds. If edge activity is less than the first threshold, step 515, then the neighboring blocks are low pass filtered, step 520. This threshold could be the standard β threshold as discussed above and presented in equations [9], [10], [11] and [12]. If the edge activity is at or higher than the first threshold, it is compared to a second threshold, step 525. If the edge activity is above the second threshold, then the pixels of the neighboring blocks are edge enhanced with high frequency emphasis filtering, step 530. If step 525 determines that the edge activity is at or less than the second threshold, then no filtering is performed.

It is to be appreciated that the described methods and apparatus can be practiced with modifications on existing architecture of the video core in MSMs, these modifications can be extended to generic hardware implementations of this feature.

In the description above, a slice can represent a set of consecutive scan lines other than 16 consecutive scan lines. Also, the data block may be an n×m block, where n is not equal to m, if the block can be subdivided. Moreover, a different color space with the same or different number of color components may be used to represent an image pixel. However, a block size of 16×16 pixels and the YCbCr color space will be used below for purposes of explanation.

As discussed above, deblocking components 125 and 165 in FIG. 1 can choose, as the system allows, different filters depending on the characteristics of the neighboring blocks. Thus the deblocking components 125 and 165 can comprise one or more types of filters such as, but not limited to, an FIR filter, an averaging filter, a Gaussian filter, and/or a polyphase filter.

Furthermore, as discussed above, the transform components 115 and 155 of FIG. 1 can comprise different types of transforms other than the H.264 integer transform as discussed above. The H.264 integer transform operates on 4×4 pixel blocks. Thus, each 4×4 block needs to be deblocked and or edge enhanced. Another type of transform is the ABSDCT (ABSolute DCT) technique. Compression techniques using ABSDCT will next be described using a block size of 16×16 pixels. Generally, each of the luminance and chrominance components is passed to a block interleaver. In one embodiment, a 16×16 block is presented to the block interleaver, which orders the image samples within the 16×16 blocks to produce blocks and composite sub-blocks of data for DCT analysis. One –16×16 DCT is applied to a first ordering, four –8×8 DCTs are applied to a second ordering, 16–4×4 DCTs are applied to a third ordering, and 64–2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks that requires the least number of bits to encode is chosen to represent the image segment.

For example, two −8×8 sub-blocks, six −4×4 sub-blocks, and eight −2×2 sub-blocks may be chosen to represent the image segment. The chosen block or combination of sub-blocks is then properly arranged in order.

For the 16×16 data block, the ABSDCT technique generates data known as PQR information that represents the block size assignment within the 16×16 block. The PQR information is a variable bit width data and describes to what extent a 16×16 block is subdivided. The R-bit of the PQR field represents whether the 16×16 block is subdivided into four −8×8 blocks.

The additional four bits are referred to as 'Q' information. Each bit of Q denotes a subdivision of an 8×8 block into four −4×4 blocks. For each bit of Q that is set, four more bits of 'P' are present to indicate if any of the 4×4 blocks are subdivided into 2×2. Accordingly, the length of PQR data can be 1 to 21 bits long, depending on the block size assignment within the 16×16 block. Thus, each block may be divided into sub-blocks of sizes 8×8, 4×4, and/or 2×2 depending on the assignment criterion.

Thus, the PQR information may be generated and used for determing which block sizes to deblock (low pass filtering and/or high frequency emphasis filtering). The PQR information is used to determine edge content in the image. The greater the edge information in a block, the smaller the block size and the longer the PQR code.

Examples of the methods and apparatus described above include:

A method for deblocking and edge enhancement of block based digital video that comprises: determining that two blocks share a common boundary, measuring edge activity of the common boundary, comparing the measured edge activity to a first threshold, filtering one or more pixels of the two blocks with a low pass filter if the edge activity is below the first threshold, and enhancing one or more pixels of the two neighboring blocks if the edge activity is at or above the first threshold.

An apparatus for deblocking and edge enhancement of block based digital video, that comprises: means for determining that two blocks share a common boundary, means for measuring edge activity of the common boundary, means for comparing the measured edge activity to a first threshold, means for filtering one or more pixels of the two blocks with a low pass filter if the edge activity is below the first threshold, and means for enhancing one or more pixels of the two neighboring blocks if the edge activity is at or above the first threshold.

An electronic device for deblocking and edge enhancement of block based digital video, the electronic device configured to determine that two blocks share a common boundary, to measure edge activity of the common boundary, to compare the measured edge activity to a first threshold, to filter one or more pixels of the two blocks with a low pass filter if the edge activity is below the first threshold, and to enhance one or more pixels of the two neighboring blocks if the edge activity is at or above the first threshold.

A computer-readable medium embodying means for causing a computer to execute a method for deblocking and edge enhancement of block based digital video, comprising: determining that two blocks share a common boundary, measuring edge activity of the common boundary, comparing the measured edge activity to a first threshold, filtering one or more pixels of the two blocks with a low pass filter if the edge activity is below the first threshold, and enhancing one or more pixels of the two neighboring blocks if the edge activity is at or above the first threshold.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

Thus, a method and apparatus for deblocking and edge enhancement of a block base video including low pass filtering and high frequency edge enhancement based on measured edge activity levels of block boundaries have been described.

What is claimed is:

1. A method for deblocking and edge enhancement of block based digital video, comprising:
   determining that two blocks share a common boundary;
   measuring edge activity of the common boundary;
   comparing the measured edge activity to a first threshold;
   filtering one or more pixels of the two blocks with a low pass filter if the edge activity is below the first threshold; and
   enhancing only pixels that are one or more pixels removed from the common boundary of the two neighboring blocks if the edge activity is at or above the first threshold.

2. The method of claim 1, further comprising:
   enhancing pixels by performing high frequency emphasis filtering.

3. The method of claim 1, further comprising:
   comparing the measured edge activity to a second threshold; and
   enhancing the one or more pixels of the two neighboring blocks if the edge activity is at or above the second threshold.

4. The method of claim 3, further comprising:
   setting the second threshold to zero.

5. The method of claim 1:
   receiving the two blocks from a base layer; and
   determining that a usable enhancement layer is received.

6. The method of claim 1, further comprising:
   enhancing pixels by performing high pass filtering of the pixel values and adding an output of the high pass filtering to the pixel values.

7. The method of claim 1, further comprising:
   setting the first threshold such that a measured edge activity below the threshold represents approximately no activity.

8. The method of claim 1, wherein the two blocks each contain 4×4 luma pixels.

9. The method of claim 1, further comprising:
   setting the first threshold to a value equal to a β threshold of an H.264 deblocking filter.

10. An apparatus for deblocking and edge enhancement of block based digital video, comprising:
    means for determining that two blocks share a common boundary;
    means for measuring edge activity of the common boundary;
    means for comparing the measured edge activity to a first threshold;
    means for filtering one or more pixels of the two blocks with a low pass filter if the edge activity is below the first threshold; and
    means for enhancing only pixels that are one or more pixels removed from the common boundary of the two neighboring blocks if the edge activity is at or above the first threshold.

11. The apparatus of claim 10, further comprising:
    means for enhancing pixels by performing high frequency emphasis filtering.

12. The apparatus of claim 10, further comprising:
    means for comparing the measured edge activity to a second threshold; and
    means for enhancing one or more pixels of the two neighboring blocks if the edge activity is at or above the second threshold.

13. The apparatus of claim 12, further comprising:
    means for setting the second threshold to zero.

14. The apparatus of claim 10, wherein the apparatus is operable for deblocking and edge enhancement based upon:
    means for receiving the two blocks from a base layer; and
    means for determining that a usable enhancement layer is received.

15. The apparatus of claim 10, further comprising:
    means for enhancing pixels by performing high pass filtering of the pixel values and adding an output of the high pass filtering to the pixel values.

16. The apparatus of claim 10, further comprising:
    means for setting the first threshold such that a measured edge activity below the threshold represents approximately no activity.

17. The apparatus of claim 10, wherein the two blocks each contain 4×4 luma pixels.

18. The apparatus of claim 10, further comprising:
    means for setting the first threshold to a value equal to a β threshold of an H.264 deblocking filter.

19. An electronic device comprising a deblocking and edge enhancement component to deblock and enhance block based digital video, the electronic device configured to determine that two blocks share a common boundary, to measure edge activity of the common boundary, to compare the measured edge activity to a first threshold, to filter one or more pixels of the two blocks with a low pass filter if the edge activity is below the first threshold, and to enhance only pixels one or more pixels removed from the common boundary of the two neighboring blocks if the edge activity is at or above the first threshold.

20. The electronic device of claim 19, further configured to enhance pixels by performing high frequency emphasis filtering.

21. The electronic device of claim 19, further configured to compare the measured edge activity to a second threshold, and enhance one or more pixels of the two neighboring blocks if the edge activity is at or above the second threshold.

22. The electronic device of claim 21, further configured to set the second threshold to zero.

23. The electronic device of claim 19, further configured to receive the two blocks from a base layer, and to determine that a usable enhancement layer is received.

24. The electronic device of claim 19, further configured to enhance pixels by performing high pass filtering of the pixel values and adding an output of the high pass filtering to the pixel values.

25. The electronic device of claim 19, further configured to set the first threshold such that a measured edge activity below the threshold represents approximately no activity.

26. The electronic device of claim 19, wherein the two blocks each contain 4×4 luma pixels.

27. The electronic device of claim 19, further configured to set the first threshold to a value equal to a β threshold of an H.264 deblocking filter.

28. A computer-readable medium embodying means for causing a computer to execute a method for deblocking and edge enhancement of block based digital video, the method comprising:
    determining that two blocks share a common boundary;
    measuring edge activity of the common boundary;
    comparing the measured edge activity to a first threshold;
    filtering one or more pixels of the two blocks with a low pass filter if the edge activity is below the first threshold; and enhancing only pixels that are one or more pixels removed from the common boundary of the two neighboring blocks if the edge activity is at or above the first threshold.

29. At least one processor configured to implement a method for deblocking and edge enhancement of block based digital video, the method comprising:

determining that two blocks share a common boundary;

measuring edge activity of the common boundary;

comparing the measured edge activity to a first threshold;

filtering one or more pixels of the two blocks with a low pass filter if the edge activity is below the first threshold; and     enhancing only pixels that are one or more pixels removed from the common boundary of the two neighboring blocks if the edge activity is at or above the first threshold.

\* \* \* \* \*